United States Patent
Uchida (10) Patent No.: US 7,924,343 B2
(45) Date of Patent: Apr. 12, 2011

(54) PHOTOGRAPHING APPARATUS AND EXPOSURE CONTROL METHOD

(75) Inventor: Akihiro Uchida, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 565 days.

(21) Appl. No.: 11/865,157

(22) Filed: Oct. 1, 2007

(65) Prior Publication Data
US 2008/0079819 A1 Apr. 3, 2008

(30) Foreign Application Priority Data

Sep. 29, 2006 (JP) ................ 2006-269384

(51) Int. Cl.
*H04N 5/222* (2006.01)
(52) U.S. Cl. ........ 348/370; 348/372; 348/373; 348/374; 348/375; 348/376
(58) Field of Classification Search ............... 348/229.1, 348/335, 340, 345, 348, 362–364, 372–376; 396/52–53, 77
See application file for complete search history.

(56) References Cited

U.S. PATENT DOCUMENTS

| | | | |
|---|---|---|---|
| 5,987,261 A | 11/1999 | Sugahara | |
| 2001/0004271 A1* | 6/2001 | Konishi | 348/371 |
| 2003/0071908 A1 | 4/2003 | Sannoh et al. | |
| 2003/0133021 A1 | 7/2003 | Hamamura et al. | |
| 2003/0161608 A1* | 8/2003 | Nishijima et al. | 386/20 |
| 2005/0157206 A1* | 7/2005 | Kato | 348/370 |
| 2007/0030381 A1* | 2/2007 | Maeda | 348/345 |

FOREIGN PATENT DOCUMENTS

| | | |
|---|---|---|
| JP | 6-121225 A | 4/1994 |
| JP | 11-41515 A | 2/1999 |
| JP | 11-84489 A | 3/1999 |
| JP | 2000-134533 A | 5/2000 |
| JP | 2001-230970 A | 8/2001 |
| JP | 2003-107567 A | 4/2003 |
| JP | 2004-328068 A | 11/2004 |
| JP | 2005-184508 A | 7/2005 |
| JP | 2006-033519 A | 2/2006 |
| JP | 2006-135391 A | 5/2006 |

OTHER PUBLICATIONS

Notice of Reasons for Rejection, dated Nov. 12, 2010, issued in corresponding JP Application No. 2006-269384, 5 pages in English and Japanese.

* cited by examiner

*Primary Examiner* — Yogesh K Aggarwal
(74) *Attorney, Agent, or Firm* — Sughrue Mion, PLLC (57) ABSTRACT

A photographing apparatus comprises a photographing device which photographs an image of an object; an illumination device which emits light at the photographing time and illuminates the object; a face detection device which detects a face area and a size of the face area of the person of the object from the image photographed by the photographing device; an object distance calculating device which calculates a distance up to the object from the size of the face area; a photographing sensitivity setting device that sets a photographing sensitivity according to the object distance; and a main emission control device which performs a main emission photographing by using the setting of the photographing sensitivity set by the photographing sensitivity setting device.

10 Claims, 7 Drawing Sheets

PHOTOGRAPHING APPARATUS AND EXPOSURE CONTROL METHOD

BACKGROUND OF THE INVENTION

1. Field of the Invention

The present invention relates to a photographing apparatus and an exposure control method, and in particular, to a technique which controls an exposure at the flash photographing time.

2. Description of the Related Art

Heretofore, it has been proposed that when the flash photography is to be performed, a distance to the object is measured, and when the measured distance is equal to or greater than the distance in which the object is under-exposed by the light amount of the main emission, an amplification factor of the image signal is increased according to this distance, thereby correcting the deterioration of the image quality due to the lack of exposure (for example, Japanese Patent Application Laid-Open Nos. 6-121225, 11-41515, and 2000-134533).

Japanese Patent Application Laid-Open No. 11-84489 discloses a strobe device in which the pre-emission of a constant light amount is performed several times, and the output signals of an image pickup device obtained for each pre-emission are amplified by different amplification factor, and based on the signal whose average level is within a predetermined range among the amplified output signals, the light amount of the main emission is calculated. Further, Japanese Patent Application Laid-Open No. 11-84489 discloses a strobe device which measures the distance up to the object, and based on the measured distance, controls the light amount of the pre-emission.

Japanese Patent Application Laid-Open No. 2003-107567 discloses a photographing apparatus which controls a strobe emitting device based on the detection result of a person's face (an occupying ratio of the face inside the image plane or whether it is backlight or not). Further, the Japanese Patent Application Laid-Open No. 2005-184508 discloses a photographing apparatus in which a light modulating control area is decided according to the face area detected from within the imaging plane, and the amount of the main emission is calculated according to the photometric value at the pre-emission time in this light modulating control area.

In recent years, a high sensitivity of the photographing sensitivity of the electronic camera has been advancing. However, when the flash photography is performed with the photographing sensitivity set to high sensitivity, a phenomenon called as "over exposure" occurs, in which an object (particularly an object at a short distance) above a certain brightness level is filled dead white.

In Japanese Patent Application Laid-Open Nos. 6-121225, 11-41515, and 2000-134533, the amplification factor of the output signal is controlled by distance information up to the object, whereas, when photographing environment is so dark that the distance up to the object is unable to be measured, the distance information cannot be obtained, and a control of the adequate amplification factor is unable to be made, thereby creating a problem. Further, in Japanese Patent Application Laid-Open No. 11-84489, the light amount of the main emission is calculated based on the average level of the amplified output signals, so that, even when part of the image is overexposed, if other parts are dark, the average level of the output signal ends up falling in a predetermined range, and thus, there has been a problem that a control of the light amount of the main emission to avoid the over exposure is unable to be made. Further, Japanese Patent Application Laid-Open Nos. 2003-107567 and 2005-184508 have hardly given thought about the setting of the photographing sensitivity.

SUMMARY OF THE INVENTION

The present invention has been carried out in view of these circumstances, and an object of the invention is to provide a photographing apparatus and an exposure control method capable of setting the most appropriate exposure control and photographing sensitivity particularly for an object at a short distance at the flash photographing time.

To solve the above described problems, the photographing apparatus according to a first aspect of the present invention of the present application comprises: a photographing device which photographs an image of the object; an illumination device which emits light at the photographing time and illuminates the object; a face detection device which detects a face area and a size of the face area of the person of the object from the image photographed by the photographing device; an object distance calculating device which calculates the distance up to the object from the size of the face area; a photographing sensitivity setting device which sets the photographing sensitivity according to the object distance; and a main emission control device which performs the main emission photographing by using the setting of the photographing sensitivity set by the photographing sensitivity setting device.

According to the first aspect of the present invention of the present application, for example, while the photographing sensitivity is reduced when the object distance is short, the photographing sensitivity is increased when the object distance is long, so that the most appropriate illumination consistent with a person's face can be made, and the over exposure of the face image can be prevented.

The photographing apparatus according to a second aspect of the present invention of the present application comprises: a photographing device which photographs an image of the object; an illumination device which emits light at the photographing time and illuminates the object; a face detection device which detects a face area and a size of the face area of the person of the object from the image photographed by the photographing device; an object distance calculating device which calculates the distance from the size of the face area to the object; a pre-emission control device which allows the illumination device to perform a pre-emission prior to the main emission photographing and performs the pre-emission photographing by the photographing device; a photographing sensitivity setting device which sets the photographing sensitivity according to the object distance at the pre-emission time; and the main emission control device which performs the main emission photographing by controlling the exposure based on the pre-emission image obtained by the pre-emission photographing.

According to the second aspect of the present invention, the photographing sensitivity is set according to the distance up to the person's face of the object so as to prevent the object from being overexposed at the pre-emission time, whereby the calculation of the exposure value and the like is accurately performed, so that the most appropriate illumination consistent with the person's face can be performed.

A third aspect of the present invention of the present application according to the photographing apparatus of the second aspect of the invention of the present application is characterized in that the main emission control device calculates the emission time or the emission intensity of the illumination device at the main emission photographing time based on the image obtained at the pre-emission time and the image obtained at the non-emission time of the illumination device.

The exposure control method according to a fourth aspect of the present invention of the present application comprises the steps of: photographing the image of an object; detecting a face area and a size of the face area of the person of the object from the image photographed in the photographing process; calculating the distance from the size of the face area to the object; setting the photographing sensitivity according to the object distance; and performing the main emission photographing by using the setting of the photographing sensitivity set in the photographing sensitivity setting step.

The exposure control method according to a fifth aspect of the present invention of the present application comprises the steps of: photographing the image of an object; detecting a face area and a size of the face area of the person of the object from the image photographed in the photographing process; calculating the distance from the size of the face area to the object; performing the pre-emission photographing by allowing the illumination device to perform the pre-emission prior to the main emission photographing; setting the photographing sensitivity according to the object distance at the pre-emission time; and performing the main emission photographing by controlling the exposure based on the pre-emission image obtained by the pre-emission photographing.

A sixth aspect of the present invention of the present application according to the exposure control method of the fifth aspect of the present invention of the present application is characterized in that, in the main emission control process, the emission time or the emission intensity of the illumination process at the main emission photographing time is calculated based on the image obtained at the pre-emission time and the image obtained at the non-emission time of the illumination process.

According to the present invention, while the photographing sensitivity is reduced when the object distance is short, the photographing sensitivity is increased when the object distance is long, so that the most appropriate illumination consistent with a person's face can be made, and the over exposure of the face image can be prevented.

DETAILED DESCRIPTION OF THE PREFERRED EMBODIMENTS

The preferred embodiments of a photographing apparatus and an exposure method according to the present invention will be described below in accordance with the accompanying drawings.

First Embodiment

Figure 1:
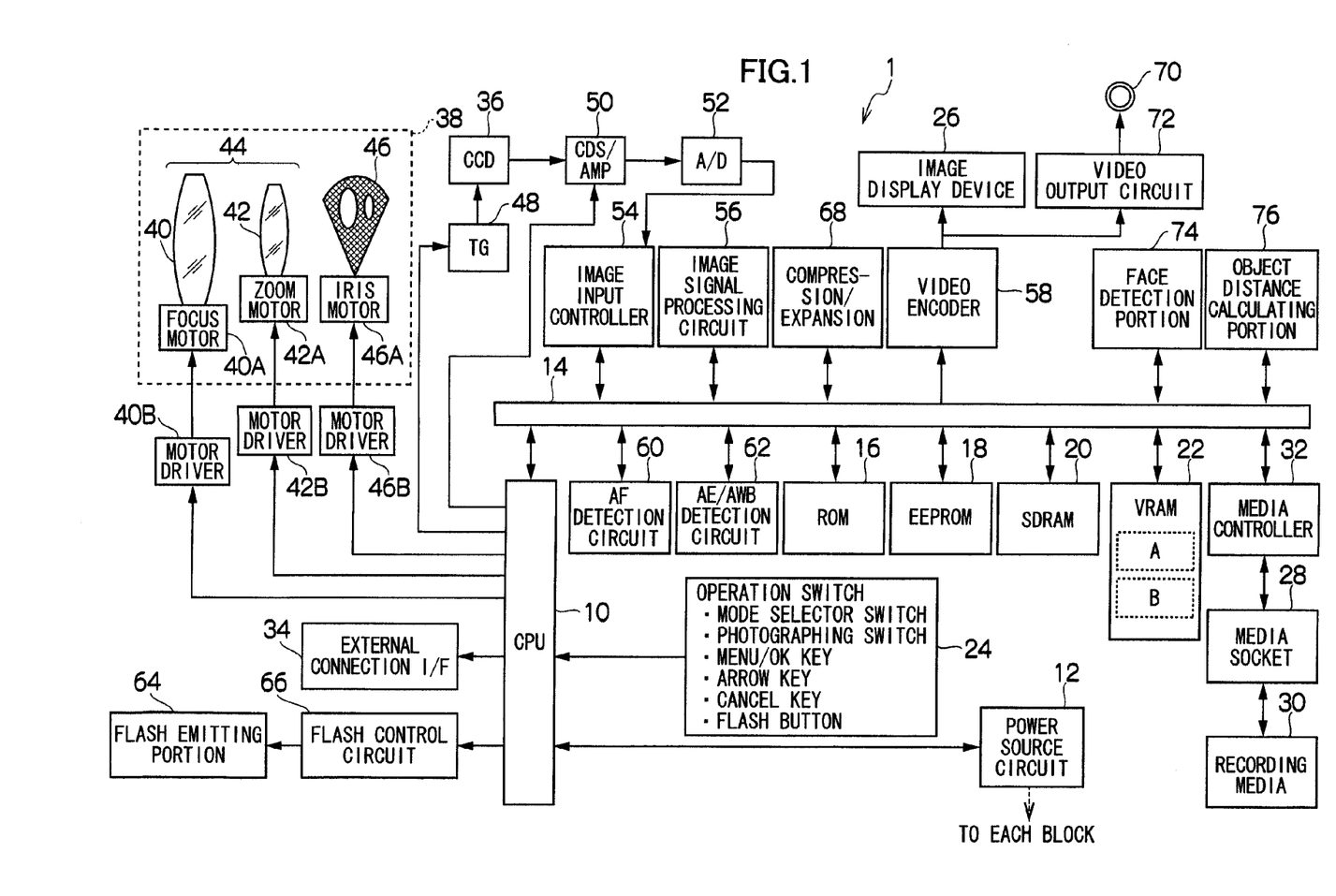
FIG. 1 is a block diagram showing the main configuration of a photographing apparatus according to a first embodiment of the present invention.

FIG. 1 is a block diagram showing the main configuration of a photographing apparatus according to the first embodiment of the present invention. The photographing apparatus 1 shown in FIG. 1 is an electronic camera comprising recording and playback functions of still images and moving images, and the operation of the entire photographing apparatus 1 is totally controlled by a central processing unit (CPU) 10. The CPU 10 functions as a control device which controls the present camera system according to a predetermined program, and at the same time, functions as a calculating device which executes various calculations such as automatic exposure (AE), automatic focusing (AF), white balance (WB), and regulator operation. A power source circuit 12 supplies a power to each block of the present camera system.

The CPU 10 is connected with a ROM (Read Only Memory) 16 and a EEPROM (Electronically Erasable and Programmable Read Only Memory) 18 through a bus 14. The ROM 16 stores programs executed by the CPU 10 and various data and the like necessary for the control, and the EEPROM 18 stores CCD pixel defect information, various constant numbers/pieces of information relating to camera operation, and the like.

Further, a memory (SDRAM, Synchronous Dynamic Random Access Memory) 20 is used as a developing area of the program and an operation work area of the CPU 10, and at the same time, is used as a temporary storage area of image data and voice data. A VRAM (Video Random Access Memory) 22 is a temporary storage memory dedicated to the image data, and includes an A area and a B area. The memory 20 and the VRAM 22 can be commonly used.

The photographing apparatus 1 is provided with operation switch 24 such as a mode selector switch, a photographing switch, a menu/OK key, an arrow key, a cancel key and the like. The signals from these various operation switches are inputted to the CPU 10, and the CPU 10 controls each circuit of the photographing apparatus 1 based on the inputted signals, and for example, performs a lens driving control, a photographing operation control, an image processing control, a recording and playback control of the image data, and a display control of the image display device 26, and the like.

The mode selector switch is an operation device to switch over a photographing mode and a playback mode. The photographing switch is an operation button which inputs an instruction to start the photographing, and is configured by a two-stage stroke type of switch having a switch S1 which turns on when half-pushed and a switch S2 which turns on when fully-pushed. The menu/OK key is an operation key functioning both as a menu button to perform instruction to display a menus on the screen of the image display device 26 and as an OK button to instruct confirmation and execution and the like of the selected content. The arrow key is an operation portion to input instructions in four directions up and down and left and right, and functions as a button (a cursor moving operation device) to select items from the menu screen and instruct the selection of each set item from each menu. Further, an upper key and a lower key of the arrow key function as a zoom switch at the photographing time or a playback zoom switch at the play back time, and a left key and a right key function as the frame-by-frame feeding (forward direction/reverse direction feeding) button at the playback time. The cancel key is used to erase the desired object such as selected item and cancel the instructed content or when restoring the operation state to one state before and the like. Flash button functions as a button to switch over the flash mode, and by push-operating the flash button under a photographing mode, the flash mode is set to each mode of flash emission/emission prohibition.

The image display device 26 is configured by a liquid crystal monitor capable of a color display. The image display device 26 can be used as an electronic finder for field view confirmation at the photographing time, and at the same time, can be used also as a device which plays back and displays the recorded image. Further, the image display device 26 is used also as a display screen for user interface, in which the information such as the menu information, selected items, and set contents are displayed. As the image display device 26, in addition to the liquid crystal monitor, another type of the display device such as an organic EL (electro-luminescence) can be also used.

The photographing apparatus 1 has a media-socket (media fixing portion) 28, and the media socket 28 can be fixed with a recording media 30. The configuration of the recording media 30 is not particularly limited, and can use a semiconductor memory card typified by a xD picture card® and a smart media®, and various media such as a portable type compact hard disk, an electromagnetic disk, an optical disk, and a magneto-optical disk. The media controller 32 performs a required signal conversion to perform the delivery of input and output signals suitable for the recording media 30 fixed to the media socket 28.

Further, the photographing apparatus 1 comprises an external connection interface portion (external connection I/F) 34 as a communication device to connect with a personal computer and other external equipment. The photographing apparatus 1 connects the photographing apparatus 1 and the external equipment by using an unillustrated USB cable and the like, so that the delivery of the data with the external equipment is made possible. The communication method between the photographing apparatus 1 and the external equipment is not limited to the USB, and IEEE1394 and Bluetooth (registered trade name) and other communication method may be applied.

[Photographing Mode]

Next, the photographing functions of the photographing apparatus 1 will be descried. When the photographing mode is selected by the mode selector switch, the photographing portion including a color CCD solid state pickup device 36 (in the following description, referred to as CCD 36) is supplied with a power, thereby putting the device into a state capable of photographing.

A lens unit 38 is an optical unit having a photographing lens 44 including a focus lens 40 and a zoom lens 42 and aperture/mechanical shutter 46. The focusing of the photographing lens 44 is performed by moving the focus lens 40 by a focus motor 40A, and the zooming is performed by moving the zoom lens 42 by a zoom motor 42A. The focus motor 40A and the zoom motor 42A are driven and controlled by a focus motor driver 40B and a zoom motor driver 42B, respectively. The CPU 10 outputs control signals to the focus motor driver 40B and the zoom motor driver 42B and controls both of them.

The aperture 46 is configured by a so-called turret type aperture, and a turret plate bored with aperture holes from F2.8 to F8 is rotated so as to change an aperture value (F value). The driving of this aperture 46 is performed by an iris motor 46A. The iris motor 46A is driven and controlled by an iris motor driver 46B. The CPU 10 outputs a control signal to this iris motor driver 46B and controls the same.

The light having passed through the lens unit 38 is image-formed on the light receiving surface of the CCD 36. A number of photodiodes (light receiving elements) are two-dimensionally arranged on the light receiving surface of the CCD 36, and primary color filters of red (R), green (G), and blue (B) corresponding to each photodiode are arranged in a predetermined array structure. The CCD 36 has an electronic shutter function to control the electric charge accumulating time (shutter speed) of each photodiode. The CPU 10 controls a charge accumulating time at the CCD 36 through a timing generator (TG) 48. Further, CPU 10 controls the potential of an OFD (Overflow Drain) for the CCD 36, and adjusts the upper limit value of the signal charge accumulated in the photodiodes comprising the CCD 36.

The object image formed on the light receiving surface of the CCD 36 is converted into the signal charges of the amount according to the incident light amount by each photodiode. The signal charges accumulated in each photodiode are read in order as voltage signals (image signals) according to the signal charges based on driving pulses (read pulse, vertical transfer clock, and horizontal transfer clock) given from the TG 48 in accordance with the instruction from the CPU 10.

The image signals read out from the CCD 36 are transferred to an analogue processing portion (CDS/AMP) 50, and here, the R, G, and B signals every pixel are sample-and-held (correlated double sample processed) and amplified, and after that, are added to an A/D converter 52. The dot sequential R, G, and B signals converted into the digital signals by the A/D converter 52 are stored in the memory 20 through an image input controller 54. The amplified gains of the R, G, and B signals in the analogue processing portion 50 are equivalent to the photographing sensitivity (ISO sensitivity), and the CPU 10 adjusts this amplified gain, thereby setting the photographing sensitivity. As for the control method of the photographing sensitivity, it will be described later.

The image signal processing circuit 56 functions as an image processing device including a simultaneous circuit (processing circuit which interpolates the spatial shift of color signals accompanied with a color filter array of the single plate CCD and converts the color signals simultaneously), a white balance adjustment circuit, a tone conversion processing circuit (for example, gamma correction circuit), a contour correction circuit, and a luminance/color difference signal generating circuit, and performs a predetermined signal processing for the R, G, and B signals stored in the memory 20 by utilizing the memory 20 according to the command from the CPU 10.

The R, G, and B signals inputted to the image signal processing circuit 56 are converted into luminance signals (Y signals) and color difference signals (Cr and Cb signals) in the image signal processing circuit 56, and at the same time, are subjected to a predetermined processing such as the tone conversion processing (for example, gamma correction). The image data processed by the image signal processing circuit 56 are stored in a VRAM 22.

When the photographed image is to be monitor-outputted to the image display device 26, the image data is read from the VRAM 22, and is transferred to a video encoder 58 through the bus 14. The video encoder 58 converts the inputted image data into the video signals of a predetermined system for display (for example, composite color image signals of NTSC system), and is outputted to the image display device 26.

The image data representing an image for one frame portion by the image signals outputted from the CCD 36 is alternatively re-written in an area A and an area B of the VRAM 22. Among the area A and the area B of the VRAM 22, from the area other than the area where the image data is re-written, a written image data is read. In this manner, the image data inside the VRAM 22 is periodically re-written, and image signals generated from the image data are supplied to the image display device 26, so that video pictures during photographing are displayed on the image display device 26 in real time. A photographer can confirm a photographing field view by the video pictures (through-movie images) displayed on the image display device 26.

When the photographing switch is half-pressed and the switch S1 is turned on, the photographing apparatus 1 starts the AE and AF processing. That is, the image signals outputted from the CCD 36, after the A/D conversion, are inputted to an AF detection circuit 60 and an AE/AWB detection circuit 62 through the image input controller 54.

The AE/AWB detection circuit 62 includes a circuit in which one image plane is divided into a plurality of divided areas (for example, 8×8 or 16×16), and the R, G, and B signals are integrated per every divided area, and supplies the integrated values to the CPU 10. The CPU 10, based on the integrated values obtained from the AE/AWB detection circuit 62, detects a brightness of the object (object luminance), and calculates an exposure value (photographing EV value) suitable for photographing. The CPU 10, in accordance with the determined exposure value and the predetermined program lines, decides an aperture value and a shutter speed, and according to this value and this speed, controls the electronic shutter and the iris of the CCD 36, thereby to obtain a suitable exposure amount.

Further, the CPU 10, when set to a flash emission mode, sends a command to a flash control circuit 66, thereby to allow the circuit 66 to operate. The flash control circuit 66 includes a main capacitor to supply the current to allow a flash emitting portion 64 (electric discharge tube) to emit a light, and performs a charge control of the main capacitor, and a control of a timing of a discharge (emission) to the flash emitting portion 64 and a discharge duration according to the flash emission instruction from the CPU 10. As for the flash emission device, a LED may be used in place of the electric discharge tube.

Further, the AE/AWB detection circuit 62, at the automatic white balance adjustment time, calculates an average integrated value by color of the R, G, and B signals every divided area, and provides the calculated result to the CPU 10. The CPU 10 obtains the integrated value of R, the integrated value of B, and the integrated value of G, and determines a ratio of R/G and a ratio of B/G every divided area, and performs a light source type discrimination based on the distribution and the like in a color space of the R/G and B/G axis-coordinates of these values of the R/G and B/G, and controls the gain values (white balance gains) for the R, G, and B signals of the white balance adjustment circuit according to the discriminated light source type, and corrects the signal of each color channel.

The AF control in the photographing apparatus 1, for example, is applied with a contrast AF, which moves the focus lens 40 such that the high frequency component of the G signal of the image signals becomes the maximum. That is, the AF detection circuit 60 comprises a high pass filter allowing the high frequency component only of the G signal to pass through, an absolute value processing portion, and an integrating portion to integrate the absolute value data inside an AF area extraction portion and the AF area, which carve out the signals inside a focus object area pre-set in the image plane (for example, image plane center portion).

The data of the integrated values determined by the AF detection circuit 60 is notified to the CPU 10. The CPU 10, while controlling the focus motor driver 40B and moving the focus lens 40, calculates a focus estimation value (AF estimation value) by a plurality of AF detection points, and decides a lens position at which the calculated focus estimation value becomes the maximum as a focused focal position. The CPU 10 controls the focus motor driver 40B so as to move the focus lens 40 to the determined focused focal position. It is to be noted that the calculation of the AF estimation value is not limited to the configuration where the G signal is used, and luminous signals (Y signals) may be used.

The photographing switch is half-pressed, and the AE/AF processing is performed by the switch S1, and the photographing switch is fully-pressed, and the photographing operation for recording is started by the switch S2 being turned on. The image data obtained in response to the turning on of the switch S2 is converted into the luminance/color-difference signals (Y/C signals) in the image signal processing circuit 56, and after being subjected to a predetermined processing such as the gamma correction, is stored in the memory 20.

The Y/C signals stored in the memory 20 are compressed according to a predetermined format by a compression expansion circuit 68, and after that, the Y/C signals are recorded in the recording media 30 through the media controller 32. For example, as for the still image, it is recorded as an image file of the JPEG (Joint Photographic Experts Group) type, and as for the moving image, it is recorded as an image file of the AVI (Audio Video Interleaving) type.

[Playback Mode]

When the playback mode is selected by the mode selector switch, the compressed data of the final image file (the image file recorded last time), which is recorded in the recording media 30, is read. When the image file according to the final record is a still image file, this read image compressed data is expanded into non-compression Y/C signals through the compression expansion circuit 68, and are converted into display signals through the image signal processing circuit 56 and the video encoder 58, and after that, are outputted to the image display device 26. As a result, the image content of the image file is displayed on the screen of the image display device 26.

During playback of one frame of the still image (also including during playback of the leading head frame of the moving image), by operating the right key or the left key of the arrow key, the image file of the playback target can be switched over (forward frame feeding/reverse frame feeding). The image file at the frame-fed position is read from the recording media 30, and in the like manner as described above, the still image and the moving image are playback-displayed on the image display device 26.

Further, at the playback time, when the external display such as a personal computer and a television receiver is connected to the photographing apparatus 1 through a video input/output terminal 70, the image file recorded in the recording media 30 is processed by a video output circuit 72 and is playback-displayed on the external display.

[Exposure Control Method]

Next, the exposure control method according to the present embodiment will be described. The photographing apparatus 1 according to the present embodiment comprises a face detection portion 74 and an object distance calculating portion 76.

The face detection portion 74, when the photographing switch is half-pressed (switch S1 is turned on), gives a face detection processing to the image data outputted from the CCD 36. As the method of the face detection processing, for example, there is a method in which the pixel having a color close to the color specified as a flesh color is extracted from an original image, and the extracted area is detected as the face area. This face detection processing, for example, is performed such that, on a color space to distinguish the flesh color from other colors, the range of the flesh color on the color space is set down from the information on the flesh color sampled in advance, and it is determined whether or not the color of each pixel is in the set range. The face detection portion 74, when detecting the face area from the image data at the time of the switch S1 being turning-on, calculates the size of this face area (for example, the size from the forehead to the chin), thereby to output the size to the object distance calculating portion 76.

The object distance calculating portion 76, based on the size of the face area inputted from the face detection portion 74, calculates a distance (object distance) L from the photographing apparatus 1 to the face of the object. The object distance L is calculated by the following formula (1) showing a geometric relationship between the object distance, where the zoom position (focal distance) of the zoom lens 42 is set constant, and a ratio of the face area to the field view detected from the image.

$$L=(Pz/P)*Lz \quad (1)$$

Here, P is a vertical ratio of the detected face area to the field view, Lz is a reference distance, and Pz is a ratio of the average sized face detected by the reference distance to the field view. However, according to the change of the zoom position, the relation (ratio) between Lz and Pz is changed, and therefore, in the present embodiment, the relation between Lz and Pz is measured every zoom position so as to be pre-stored in the EEPROM 18. The object distance calculating portion 76 obtains the information on the zoom position through the CPU 10, and a pair of the values of Lz and Pz corresponding to the obtained zoom position is taken out from the EEPROM 18, and calculates a vertical ratio P of the detected face area in the image to the field view, thereby to calculate the object distance L.

The information on the object distance L calculated by the object distance calculating portion 76 is outputted to the CPU 10. The CPU 10 adjusts the photographing sensitivity based on the object distance L inputted from the object distance calculating portion 76.

Figure 2:
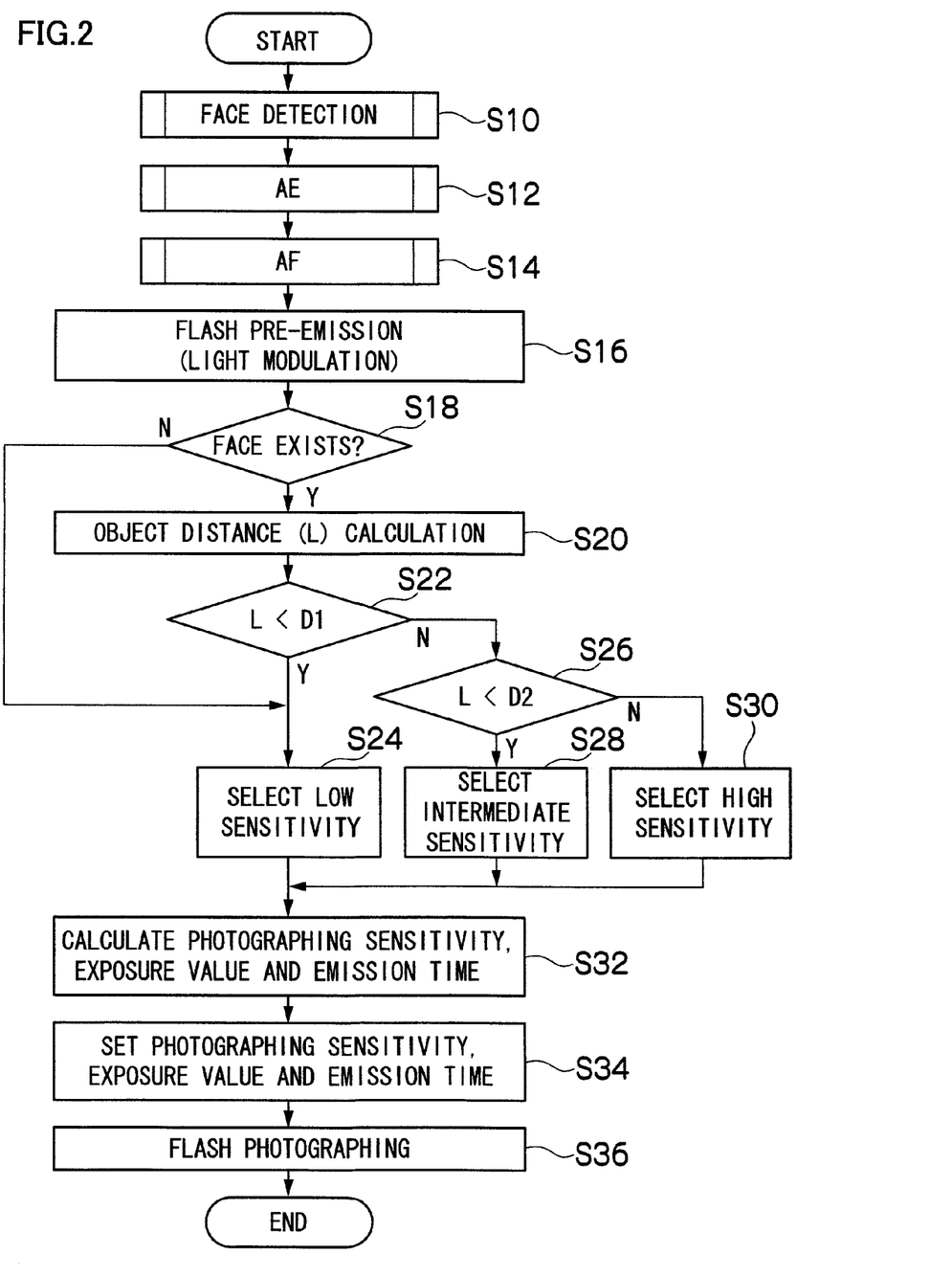
FIG. 2 is a flowchart showing an exposure control method according to the first embodiment of the present invention.

Next, the exposure control method according the first embodiment of the present invention will be described with reference to the flowchart of FIG. 2. First, at the photographing mode time, the apparatus is set to a flash emission mode, and when the photographing switch is half-pressed (switch S1 turned on), the image data outputted from the CCD 36 is subjected to the face detection processing (step S10), and at the same time, the AE and AF processings are executed (steps S12 and S14). Further, a pre-emission is performed by the flash emitting portion 64 (step S16).

Next, when the face area is detected from the image at the time of a switch S1 being turned on (Yes of step S18), the size of the detected face area is measured so that a value P is calculated, and based on the above described formula (1), the object distance L is calculated (step S20). Based on this object distance L, the setting of the photographing sensitivity is selected (steps S22 to S30). When the object distance L is smaller than a threshold value D1 (Yes of Step S22), the setting of a low sensitivity (for example, the smallest value possible to set the photographing sensitivity) is selected (step S24). On the other hand, when the object distance L is equal to or more than the threshold value D1 (No of step S22) and smaller than a threshold value D2 (Yes of step S26), the setting of an intermediate sensitivity larger than the low sensitivity is selected (step S28). Further, when the object distance L is equal to or more than the threshold value D2 (No of step S22 and No of step S26), the setting of a high sensitivity (for example, the maximum possible value to set the photographing sensitivity) larger than the intermediate sensitivity is selected (step S30). It is to be noted that D1<D2.

On the other hand, when the face area is not detected from the image at the time of a switch S1 being turned on (No of step S18), the setting of the low sensitivity is selected (step S24), and the procedure advances to the process subsequent to step S32.

Next, based on the setting of the photographing sensitivity selected in step S22 to step S30, the photographing sensitivity, the exposure value, and the emission amount (emission time and emission intensity) of the flash emitting portion 64 at the main emission time are calculated and set (steps S32 and S34), so that the main emission photographing is performed (step S36).

According to the present embodiment, the photographing sensitivity is reduced when the distance L up to the person's face of the object is short, whereas the photographing sensitivity is increased when the distance L is long, so that the most appropriate illumination consistent with the person's face can be performed, and thus, the over exposure of the face image can be prevented.

Second Embodiment

Figure 3:
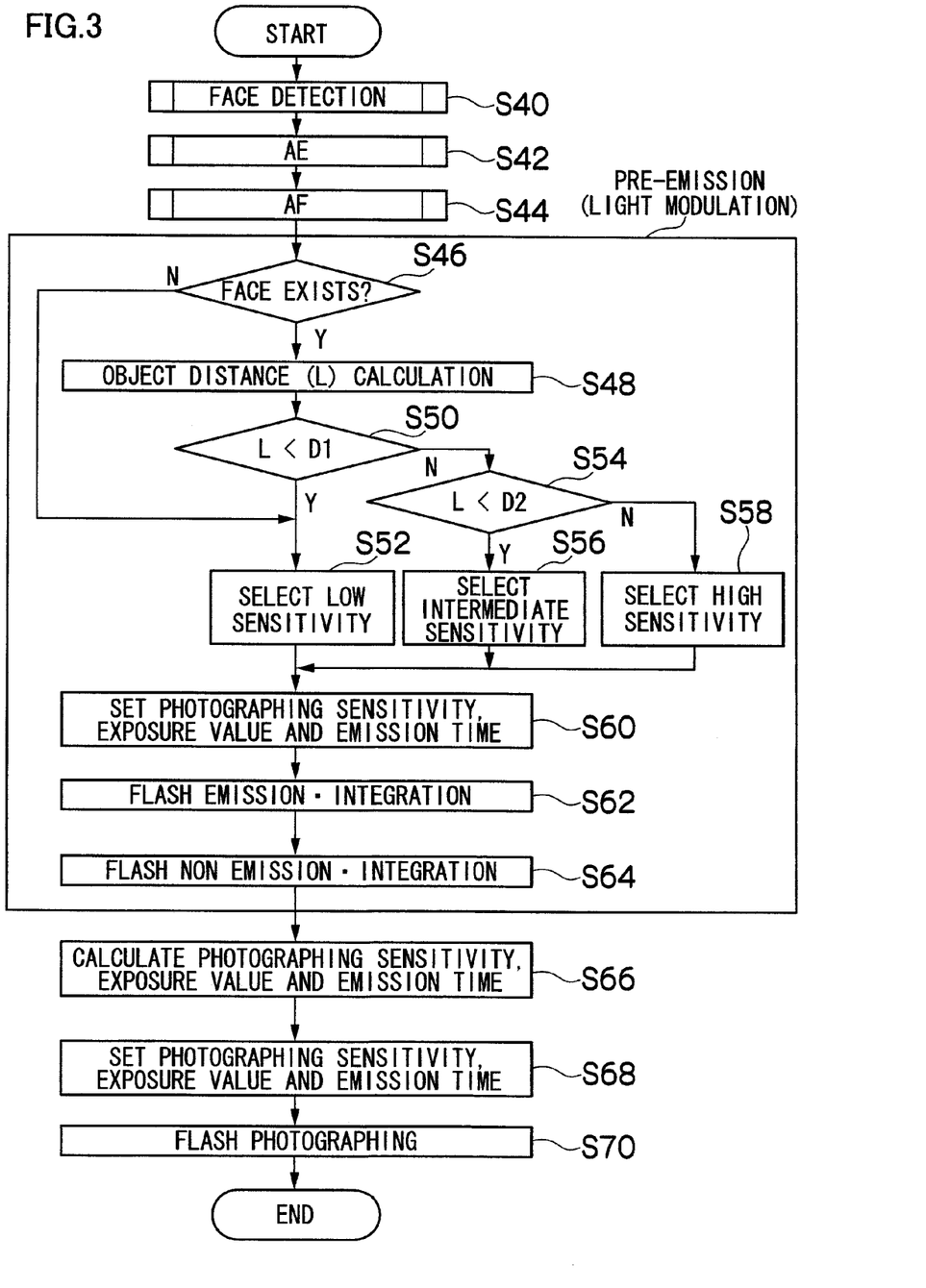
FIG. 3 is a flowchart showing an exposure control method according to a second embodiment of the present invention.

Next, a second embodiment of the present invention will be described. Regarding the configuration of a photographing apparatus, it is the same as that of the first embodiment. FIG. 3 is a flowchart showing an exposure control method according to the second embodiment of the present invention.

First, at the photographing mode time, the apparatus is set to a flash emission mode, and when a photographing switch is half-pressed (switch S1 turned on), an image data outputted from a CCD 36 is subjected to a face detection processing (step S40), and at the same time, AE and AF processings are executed (steps S42 and S44).

Next, when the face area is detected from the image at the time of a switch S1 being turned on (Yes of step S46), the size of the detected face area is measured to calculate a value P, and based on the above describe formula (1), the object distance L is calculated (step S48). Based on this object distance L, the setting of the photographing sensitivity is selected (steps S50 to S58). When the object distance L is smaller than a threshold value D1 (Yes of step S50), the setting of a low sensitivity is selected (step S52). On the other hand, when the object distance L is equal to or more than the threshold value D1 (No of step S50) and smaller than a threshold value D2 (Yes of step S54), the setting of an intermediate sensitivity is selected (step S56). Further, when the object distance L is equal to or more than the threshold value D2 (No of step S50 and No of step S54), the setting of a high sensitivity is selected (step S58). In the similar way as the first embodiment, D1<D2.

On the other hand, when the face area is not detected at the time of a switch S1 being turned on (No of step S46), the setting of the low sensitivity is selected (step S52), and the procedure advances to the process subsequent to step S60.

Next, based on the setting of the photographing sensitivity selected in steps S50 to S58, the photographing sensitivity, the exposure value, and the emission amount (emission time and emission intensity) of the flash emitting portion 64 at the pre-emission time are set (step S60). By the flash emitting portion 64, a pre-emission is performed, and the integrated values of R, G, and B signals every divided area for the image obtained at the pre-emission time are calculated (step S62). Further, the integrated values are similarly calculated also for the image when the pre-emission is not performed (at non-emission time) (step S64).

Next, from the difference of the data between the integrated value calculated from the image at the pre-emission time and the integrated value calculated from the image at the non-emission time, the photographing sensitivity, the exposure value, and the emission amount (emission time and emission intensity) of the flash emitting portion 64 at the main emission time are calculated and set (steps S66 and S68), so that the main emission photographing is performed (step S70).

Figure 4:
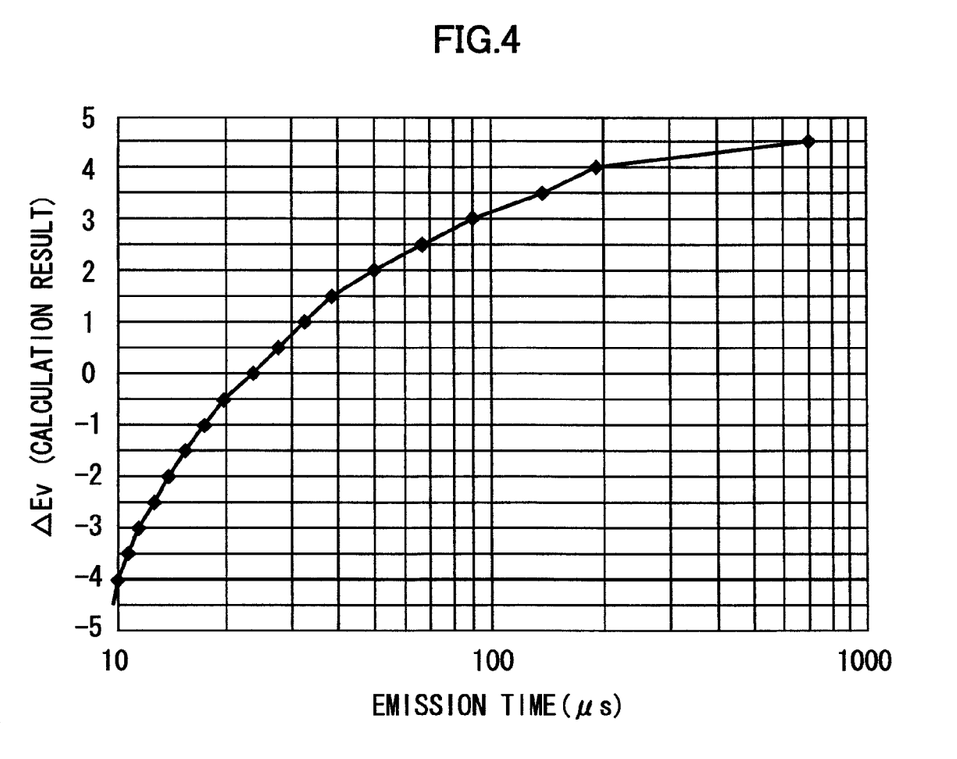
FIG. 4 is a graph illustrating a table showing the relationship between a flash emission time and a ΔEv value.

FIG. 4 is a graph illustrating a table showing the relationship between the flash emission time and ΔEv value. When the flash emission time is to be calculated, first, the integrated value calculated from the image at the pre-emission time: ipre, the integrated value calculated from the image at the non-emission time: ith, the target integrated value: iob, the photographing sensitivity (SV value) at the pre-emission time: Sv_pre, the photographing sensitivity (SV value) at the main emission time: Sv_rec are substituted by the following formula (2), so that the ΔEv value is calculated.

$$\Delta Ev = \log \{iob/(ipre-ith)\}/\log 2 + (Sv\_pre - Sv\_rec) \quad (2)$$

From the calculated ΔEv value and the table of FIG. 4, the flash emission time is calculated.

According to the present embodiment, the photographing sensitivity is set according to the distance up to the person's face of the object so as to prevent the object from being overexposed at the pre-emission time, whereby the calculation of the exposure value and the like are accurately performed and the most appropriate illumination consistent with the person's face can be executed.

Third Embodiment

Figure 5:
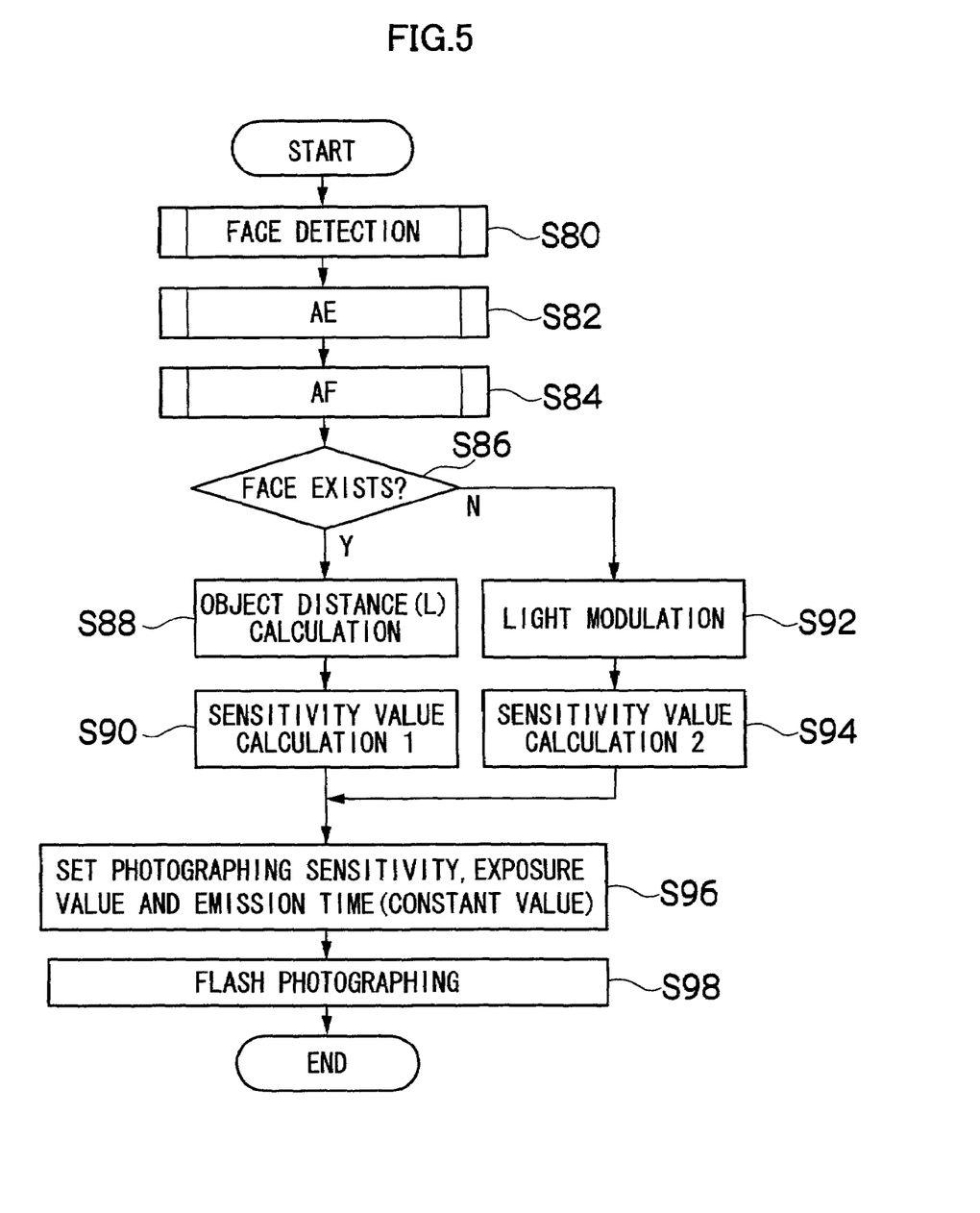
FIG. 5 is a flowchart showing the exposure control method according to a third embodiment of the present invention.

Next, a third embodiment of the present invention will be described. Regarding the configuration of a photographing apparatus, it is the same as that of the first embodiment. FIG. 5 is a flowchart showing an exposure control method according to the third embodiment of the present invention.

First, at the photographing mode time, the apparatus is set to a flash emission mode, and when a photographing switch is half-pressed (switch S1 turned on), an image data outputted from a CCD 36 is subjected to a face detection processing (step S80), and at the same time, AE and AF processings are executed (steps S82 and S84).

Next, when the face area is detected from the image at the time of a switch S1 being turned on (Yes of step S86), the size of the detected face area is measured to calculate a value P, and based on the above describe formula (1), the object distance L is calculated (step S88). Based on this object distance L, the photographing sensitivity is calculated (step S90: sensitivity value calculation 1). Due to the flash emission, the brightness of the object is inversely proportional to the square of the distance L up to the object, and therefore, in the process of the sensitivity value calculation 1, the value of the photographing sensitivity is made proportional to the square of the object distance L. That is, the value ΔSv of the photographing sensitivity is calculated by the following formula (3):

$$\Delta Sv = k_{zoom} * L^2 \quad (3)$$

Here, when the F value of the aperture changes every zoom position, the value of the factor $k_{zoom}$ changes according to the zoom position. The relationship between the value of the factor $k_{zoom}$ and the zoom position is stored in the EEPROM 18.

On the other hand, when the face area is not detected from the image at the time of a switch S1 being turned on (No of step S86), the pre-emission is performed, the integrated values of R, G, and B signals every divided area regarding the image at the pre-emission time and the image at the non-emission time are calculated (step S92: light modulating process). Next, ΔEv value is calculated from the flash emission time (fixed value) at the main emission time and the table of FIG. 4. The integrated value calculated from the image at the pre-emission time: ipre, the integrated value calculated from the image at the non-emission time: ith, the target integrated value: iob, the photographing sensitivity (SV value) at the pre-emission time: Sv_pre, and ΔEv value are substituted by the following formula (4):

$$Sv\_rec = \log \{iob/(ipre-ith)\}/\log 2 + Sv\_pre - \Delta Ev \quad (4)$$

and the photographing sensitivity (SV value) at the main emission time: Sv_rec is calculated.

Next, based on the setting of the photographing sensitivity selected in step S90 or S94, the photographing sensitivity, the exposure value, and the emission time (fixed value) at main emission time are set (step S96), so that the main emission photographing is performed (step S98).

According to the present embodiment, the photographing sensitivity is set according to the distance up to the person's face of the object, so that the most appropriate illumination consistent with the person's face can be made, and the over exposure of the face image can be prevented. Further, when the face area can be detected from within the image, there is no need to perform the CCD light modulation, and therefore, the photographing processing can be performed at high speed.

Fourth Embodiment

Figure 6:
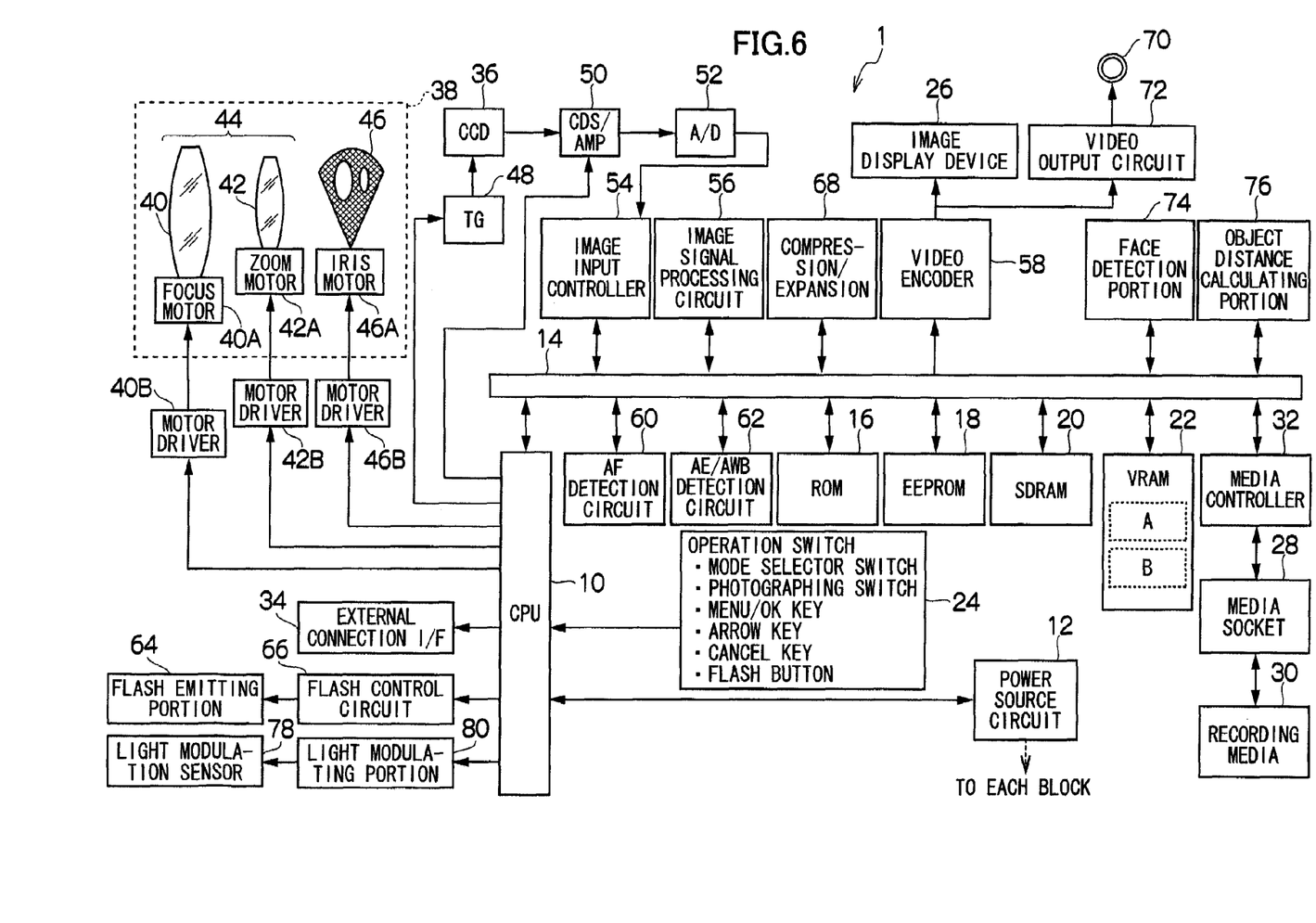
FIG. 6 is a block diagram showing the main configuration of the photographing apparatus according to a fourth embodiment of the present invention.

Next, a fourth embodiment of the present invention will be described. FIG. 6 is a block diagram showing the main configuration of a photographing apparatus according to the fourth embodiment of the present invention. In the following description, the same configuration as the first embodiment will be attached with the same reference numerals, and the description thereof will be omitted.

The photographing apparatus 1 shown in FIG. 6 comprises a light modulation sensor 78 and a light modulating portion 80. The light modulation sensor 78 receives a strobe light reflected by the object and performs a photoelectric conversion. The photo-electric current obtained by this photoelectric conversion of the light modulation sensor 78 is accumulated in a capacitor provided for the light modulating portion 80. The light modulating portion 80 monitors a charging state of the capacitor, and when determining that the capacitor is charged up to a predetermined amount, outputs an emission stop instruction to the flash emitting portion 64. The flash emitting portion 64, based on the emission stop instruction from the light modulating portion 80, cuts the power supply to the electric discharge tube, thereby stopping the emission.

Figure 7:
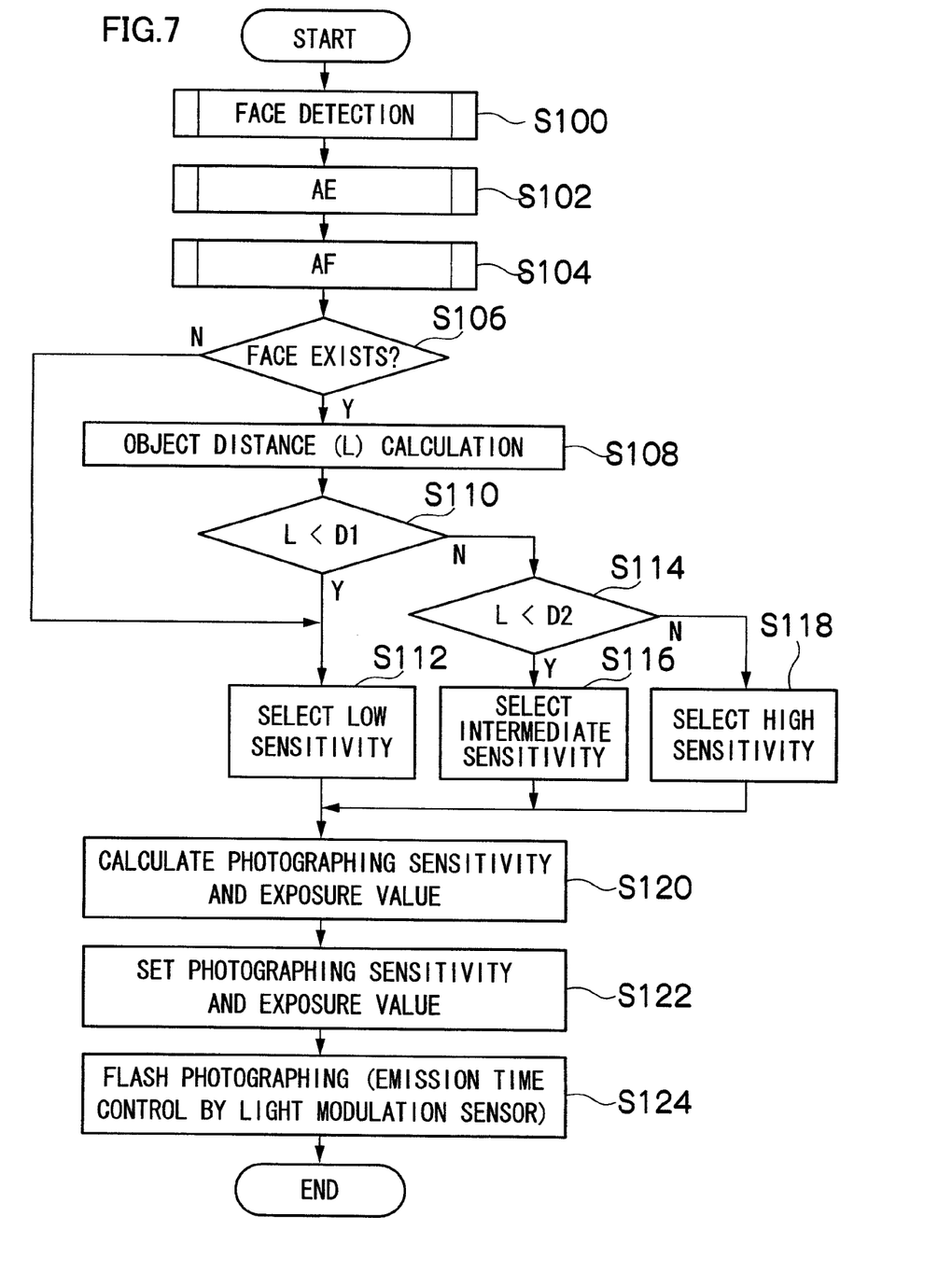
FIG. 7 is a flowchart showing the exposure control method according to the fourth embodiment of the present invention.

Next, the exposure control method according to the fourth embodiment of the present invention will be described with reference to the flow chart of FIG. 7. First, at the photographing mode time, the apparatus is set to a flash emission mode, and when a photographing switch is half-pressed (switch S1 turned on), an image data outputted from a CCD 36 is subjected to a face detection processing (step S100), and at the same time, AE and AF processings are executed (steps S102 and S104).

Next, when the face area is detected from the image at the time of a switch S1 being turned on (Yes of step S106), the size of the detected face area is measured to calculate a value P, and based on the above describe formula (1), the object distance L is calculated (step S108). Based on the calculated object distance L, the setting of the photographing sensitivity is selected (steps S110 to S118). When the object distance L is smaller than a threshold value D1 (Yes of step S110), the setting of a low sensitivity is selected (step S112). On the other hand, when the object distance L is equal to or more than the threshold value D1 (No of step S110) and smaller than a threshold value D2 (Yes of step S114), the setting of an intermediate sensitivity is selected (step S116). Further, when the object distance L is equal to or more than the threshold value D2 (No of step S114), the setting of a high sensitivity is selected (step S118). It is to be noted that D1<D2.

On the other hand, when the face area is not detected from the image at the time of a switch S1 being turned on (No of step S110), the setting of a low sensitivity is selected (step S112), and the procedure advances to the process subsequent to step S120.

Next, based on the setting of the photographing sensitivity selected in steps S110 to S118, the photographing sensitivity and the exposure value at the main emission time are calculated and set (steps S120 and S122), so that the main emission photographing is performed. When it is determined that the capacity of the light modulating portion 80 is charged up to the constant level, the emission of the flash emitting portion 64 is stopped (step S124).

In general, when the control of the flash emission time is performed by the light modulation sensor, the emission is terminated at the point where the emission amount reaches a predetermined amount. However, when the object is in the vicinity and the photographing sensitivity is high, even by the smallest value of the flash emission time (the smallest value decided by the fluctuation of the time from the emission signal turns on till the emission starts), the face of the object is sometimes overexposed. According to the present embodiment, when the distance up to the person's face of the object is short, the photographing sensitivity is set to low, so that the most appropriate illumination consistent with the person's face can be performed, and the over exposure of the face image can be prevented.

In the photographing apparatus according to each of the above described embodiments, for example, an operating member to switch over a mode manually selecting the photographing sensitivity and an automatic control mode of the photographing sensitivity by the face detection may be provided.

What is claimed is:

1. A photographing apparatus, comprising:
    a photographing device which photographs an image of an object;
    an illumination device which emits light at the photographing time and illuminates the object;
    a face detection device which detects a face area and a size of the face area of the person of the object from the image photographed by the photographing device;
    an object distance calculating device which calculates an object distance to the object from the photographing device based on the size of the face area;
    a photographing sensitivity setting device which sets a photographing sensitivity according to the calculated object distance;
    a pre-emission control device which performs a pre-emission to illuminate the object by the illumination device and performs a pre-emission photographing by the photographing device with the set photographing sensitivity; and
    a main emission control device which performs the main emission photographing by controlling an exposure based on a pre-emission image obtained by the pre-emission photographing.

2. The photographing apparatus according to claim 1, wherein the main emission control device, based on the pre-emission image obtained at the pre-emission time and the image obtained at the non-emission time of the illumination device, calculates the emission time or the illumination intensity of the illumination device of the main emission photographing time.

3. The photographing apparatus according to claim 1, wherein
    the main emission control device sets the photographing sensitivity, an exposure value, and an emission time and an emission intensity of the illumination device based on the pre-emission image and an image photographed without the pre-emission.

4. An exposure control method, comprising the steps of:
    photographing an image of an object by a photographing apparatus;
    detecting a face area and a size of the face area of the person of the object from an image photographed in the photographing process;
    calculating an object distance to the object from the photographing apparatus based on a size of the face area;
    setting a photographing sensitivity according to the calculated object distance;
    performing a pre-emission to illuminate the object by an illumination device of the photographing apparatus and performing a pre-emission photographing with the set photographing sensitivity; and
    performing the main emission photographing by controlling an exposure based on a pre-emission image obtained by the pre-emission photographing.

5. The exposure control method according to claim 4, wherein the main emission control process, based on the pre-emission image obtained at the pre-emission time and the image obtained at the non-emission time of the illumination process, calculates the emission time or the emission intensity of the illumination process at the main emission photographing time.

6. The exposure control method according to claim 4, wherein
    in the step of performing the main emission photographing, the photographing sensitivity, an exposure value, and an emission time and an emission intensity of the illumination device are set based on the pre-emission image and an image photographed without the pre-emission.

7. A photographing apparatus, comprising:
    a photographing device which photographs an image of an object;
    an illumination device which emits light at the photographing time and illuminates the object;
    a face detection device which detects a face area and a size of the face area of the person of the object from the image photographed by the photographing device;
    an object distance calculating device which calculates an object distance to the object from the photographing device based on the size of the face area;
    a photographing sensitivity setting device which sets a photographing sensitivity according to the calculated object distance; and
    a main emission control device which performs a main emission photographing by using a setting of the photographing sensitivity set by the photographing sensitivity setting device, wherein
    the object distance calculating device obtains a reference distance Lz and a ratio Pz of an average sized face at the reference distance to a field view of an image corresponding to a zoom position of the photographing device, and calculates the object distance L based on a vertical ratio P of the detected face area to the field view of an image by a formula: $L=(Pz/P)*Lz$.

8. A photographing apparatus, comprising:

a photographing device which photographs an image of an object;

an illumination device which emits light at the photographing time and illuminates the object;

a face detection device which detects a face area and a size of the face area of the person of the object from the image photographed by the photographing device;

an object distance calculating device which calculates an object distance to the object from the photographing device based on the size of the face area;

a photographing sensitivity setting device which sets a photographing sensitivity according to the calculated object distance;

a pre-emission control device which performs a pre-emission to illuminate the object by the illumination device and performs a pre-emission photographing by the photographing device with the set photographing sensitivity; and a main emission control device which performs the main emission photographing by controlling an exposure based on a pre-emission image obtained by the pre-emission photographing, wherein the object distance calculating device obtains a reference distance Lz and a ratio Pz of an average sized face at the reference distance to a field view of an image corresponding to a zoom position of the photographing device, and calculates the object distance L based on a vertical ratio P of the detected face area to the field view of an image by a formula: $L=(Pz/P)*Lz$.

9. An exposure control method, comprising the steps of:

photographing an image of an object by a photographing apparatus;

detecting a face area and a size of the face area of the person of the object from an image photographed in the photographing process;

calculating an object distance to the object from the photographing apparatus based on a size of the face area;

setting a photographing sensitivity according to the calculated object distance; and performing the main emission photographing by using the setting of the photographing sensitivity set in the photographing sensitivity setting step, wherein the calculating step includes the steps of:

obtaining a reference distance Lz and a ratio Pz of an average sized face at the reference distance to a field view of an image corresponding to a zoom position of the photographing device; and calculating the object distance L based on a vertical ratio P of the detected face area to the field view of an image by a formula: $L=(Pz/P)*Lz$.

10. An exposure control method, comprising the steps of:

photographing an image of an object by a photographing apparatus;

detecting a face area and a size of the face area of the person of the object from an image photographed in the photographing process;

calculating an object distance to the object from the photographing apparatus based on a size of the face area;

setting a photographing sensitivity according to the calculated object distance;

performing a pre-emission to illuminate the object by an illumination device of the photographing apparatus and performing a pre-emission photographing with the set photographing sensitivity; and performing the main emission photographing by controlling an exposure based on a pre-emission image obtained by the pre-emission photographing, wherein the calculating step includes the steps of:

obtaining a reference distance Lz and a ratio Pz of an average sized face at the reference distance to a field view of an image corresponding to a zoom position of the photographing device; and calculating the object distance L based on a vertical ratio P of the detected face area to the field view of an image by a formula: $L=(Pz/P)*Lz$.

* * * * *